United States Patent

[11] 3,631,388

| [72] | Inventor | Raymond K. Strong<br>41974 Chadbourne Drive, Fremont, Calif. 94538 |
|---|---|---|
| [21] | Appl. No. | 70,366 |
| [22] | Filed | Sept. 8, 1970 |
| [45] | Patented | Dec. 28, 1971 |

[54] ENGINE OIL AND WATER TEMPERATURE AUDIO WARNING SYSTEM
2 Claims, 1 Drawing Fig.

[52] U.S. Cl. .................................................. 340/52 F, 340/57, 340/60
[51] Int. Cl. .................................................. B60q 5/00
[50] Field of Search ........................................ 340/52, 52 F, 53, 57, 60

[56] References Cited
UNITED STATES PATENTS

| 1,481,471 | 1/1924 | La Londe ...................... | 340/52 |
| 2,511,631 | 6/1950 | Gordon ......................... | 340/52 |

*Primary Examiner*—Alvin H. Waring
*Attorney*—Harris Zimmerman

ABSTRACT: A system which audibly warns a driver of a motor vehicle when either the engine oil pressure is too low or the temperature is too high. The system is so arranged that the audible warning is not sounded during initial startup of the engine when the oil pressure is inherently low.

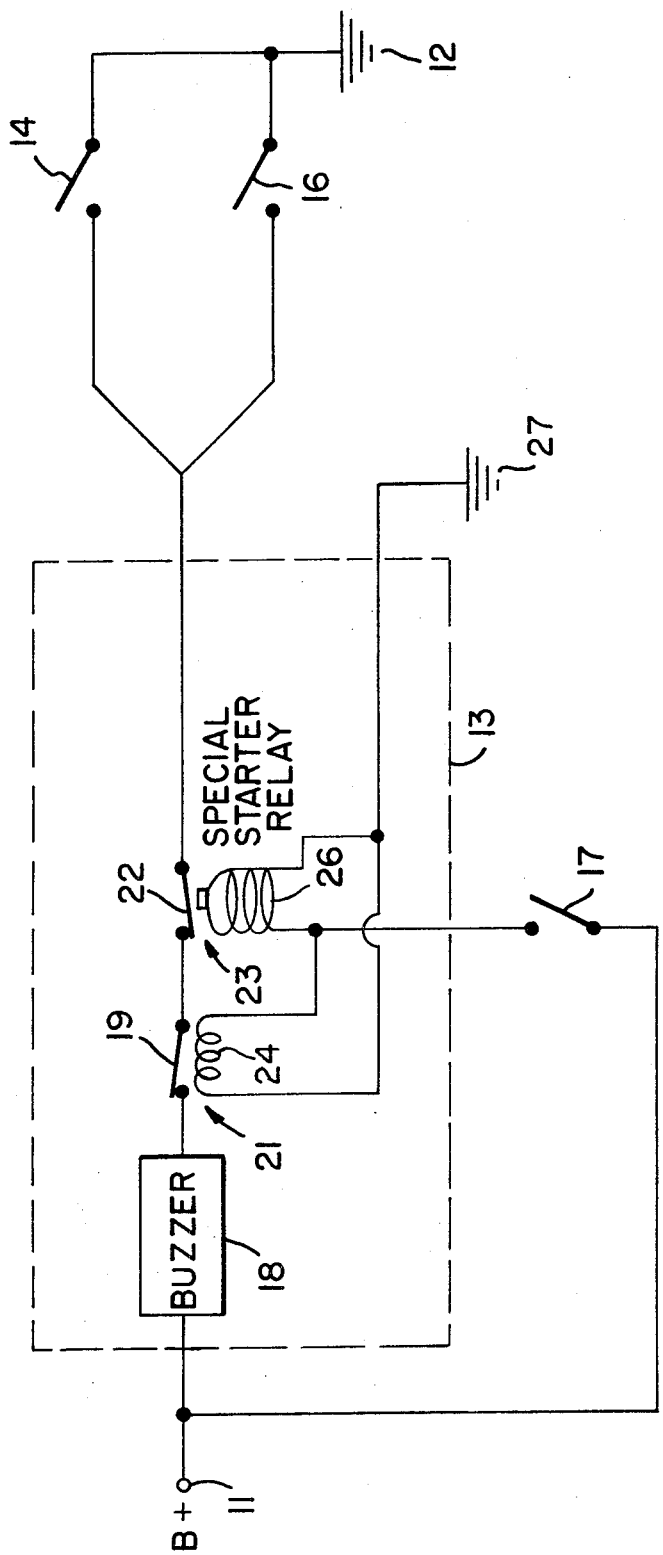

ENGINE OIL AND WATER TEMPERATURE AUDIO WARNING SYSTEM

BACKGROUND OF THE INVENTION

Various systems have been devised heretofore to provide an audible signal when the oil pressure of an engine is too low, or the engine temperature is too high. Generally such systems are an extension of the oil pressure or engine temperature warning lights which are nowadays provided on the dashboard of a motor vehicle to indicate when such conditions are not proper. As in well known, such indicator lights, particularly the low oil pressure light, is subject to false indication of the true engine conditions upon startup of the vehicle. More particularly, the oil pressure will be low upon initial startup, but will rise to a true working level in a matter of seconds after the engine is running. Similarly, after the engine has been run for a substantial time prior to shutdown and is soon restarted, the engine temperature is initially at a sufficiently high level to light the indicator light, but soon drops to a safe level which results in extinction of the light. With prior audible systems which follow the behavior of the indicator lights, the audible signal which is thus erroneously generated during the startup period is annoying to the operator of the vehicle.

SUMMARY OF THE INVENTION

The present invention relates to an audible warning system for signaling when the engine oil pressure of a motor vehicle is too low, or the engine temperature is too high. In accordance with the particularly salient aspects of the invention, the system is so arranged that the audible alarm is not sounded during the initial start up period of the engine when the readings of pressure and temperature are not indicative of the true steady state running conditions of the engine.

In the accomplishment of the foregoing, the audio warning system of the present invention generally includes a buzzer, or equivalent audible alarm, which is connected in series with the positive terminal of a motor vehicle storage battery and ground through the parallel combination of the normally open oil pressure indicator light control switch. If either indicator light control switch is closed, thus signaling an underpressure or overtemperature, the buzzer is simultaneously actuated. However, in accordance with the particularly salient aspects of the present invention, the normally closed contacts of a starter dropout relay and normally closed time delayed closing contacts of a delay relay are included in the circuit between the buzzer and indicator lamp control switches. Upon initial startup of the engine by energization of the starter circuit, the contacts of the dropout relay and delay relay are opened, thereby disabling the buzzer even though the oil pressure and temperature indicator control switches may be closed. Subsequent to starting of the engine, the starter pickup relay closes, however, the delay relay contacts remain open for a predetermined period of time sufficient for engine conditions to reach their normal operating values. The delay relay contacts then close such that the buzzer is only sounded if the running operating pressure and/or temperature are truly detrimental.

BRIEF DESCRIPTION OF THE DRAWING

The single FIGURE is a schematic circuit diagram of the audio warning system of the present invention.

DETAILED DESCRIPTION OF THE PREFERRED EMBODIMENT

Referring now to the drawing in detail, there is shown the positive terminal 11 of a motor vehicle storage battery coupled to ground as indicated at 12 through an audio warning system 13, in accordance with the present invention, in series with the parallel combination of a low oil pressure indicator light control switch 14 and high engine temperature indicator light control switch 16. Battery terminal 11 is also connected to a control circuit of the warning system 13 through a starter circuit energization control switch 17.

The warning system 13 includes a buzzer 18, or equivalent audible signaling device, connected in series with normally closed contacts 19 of a delay relay 21 and normally closed contacts 22 of a starter dropout relay 23. The series combination of the buzzer 18, contacts 19, and contacts 22 is connected between the battery terminal 11 and parallel combination of control switches 14 and 16.

As regards the control circuit of the warning system 13, same will be seen to include the operating coils 24 and 26 respectively of relays 21 and 23. Such coils are parallel connected between the starter circuit energization control switch 17 and ground, as indicated at 27. It is particularly important to note that the normally closed contacts 19 of delay relay 21 are of the time-delayed closing variety which may be set to close a predetermined number of seconds after the operating coil 24 is deenergized.

In the operation of the warning system physically described hereinbefore, upon closure of starter switch 17 to start the engine, the operating coils 24 and 26 of relays 21 and 23 are energized. As a result the contacts 19 and 22 open, thereby disabling the buzzer 18 during engine startup. When the switch 17 is opened, the contacts 22 close. However, the contacts 19 remain open for a predetermined number of seconds prior to closing. During this delay period normal engine running conditions are established and if all is well the oil pressure rises to a safe level and the temperature drops to a safe level in the event it was elevated due to prior running of the engine. Thus, even though the switches 14 and 16 may close during the initial startup period and light the oil pressure and temperature warning indicator lights, the buzzer is not sounded by virtue of the action of the delay relay 21. After the contacts 19 of the delay relay close, the buzzer is sounded when either of the switches 14 and 16 close, thereby signaling a truly detrimental operating condition of the engine.

I claim:
1. An engine oil pressure and water temperature audio warning system for connection between the positive terminal of a vehicle storage battery and the oil pressure and water temperature warning light control switches thereof which are connected to ground, said system comprising an audible signaling device, time delay relay means coupling said device in series with said positive terminal and said control switches, said relay means having a control circuit portion for effecting opening of the circuit between said device and control switches in response to energization of the control circuit portion and effecting closing of the circuit a predetermined time delay after deenergization, and means for connecting said control circuit portion and a starter circuit energization switch of the vehicle in series between said terminal and ground, whereby said device is sounded in response to closure of said warning light control switches except during said predetermined time delay following closure of said starter circuit energization switch to start said vehicle.

2. A system according to claim 1, further defined by said relay means comprising a starter dropout relay including normally closed contacts and an operating coil, and a time delay relay including normally closed time delayed closing contacts and an operating coil, said contacts of said relays serially connected between said signaling device and said warning light control switches, said device being connected to said battery terminal, said operating coils comprising said control circuit portion and being parallel connected between said starter circuit energization switch and ground, said starter circuit energization switch being connected to said battery terminal.

* * * * *